US006388764B2

(12) United States Patent
Petkovsek

(10) Patent No.: US 6,388,764 B2
(45) Date of Patent: *May 14, 2002

(54) GENERIC SPECIAL SERVICE MAILING ASSEMBLY AND A SYSTEM AND METHOD FOR AUTOMATING THE IMAGING OF SAME

(76) Inventor: Glenn Petkovsek, 2 Saverne Cir., Little Rock, AR (US) 72211

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/923,168

(22) Filed: Sep. 4, 1997

Related U.S. Application Data

(63) Continuation-in-part of application No. 08/855,032, filed on May 13, 1997.

(51) Int. Cl.[7] .................... G06K 15/00

(52) U.S. Cl. .................... 358/1.18; 283/61

(58) Field of Search .................... 395/101, 105, 395/106, 109, 111, 117; 358/400, 401, 403, 501, 448; 382/101, 103, 175, 176; 705/406, 404, 408; 229/69; 40/299.01, 638; 283/71, 81, 67, 61; 462/2, 6

(56) References Cited

U.S. PATENT DOCUMENTS

| | | | | |
|---|---|---|---|---|
| 4,418,865 A | | 12/1983 | Bowen | 229/69 |
| 4,492,334 A | | 1/1985 | Dicker | 229/69 |
| 4,565,317 A | | 1/1986 | Kranz | 229/302 |
| 4,682,793 A | | 7/1987 | Walz | 462/2 |
| 5,183,203 A | | 2/1993 | Sanders | 229/300 |
| 5,190,210 A | | 3/1993 | Walz | 229/69 |
| 5,476,420 A | | 12/1995 | Manning | 462/6 |
| 5,507,526 A | | 4/1996 | Petkovsek | 283/67 |
| 5,573,277 A | * | 11/1996 | Petkovsek | 283/79 |
| 5,626,286 A | * | 5/1997 | Petkovsek | 229/300 |
| 5,697,648 A | * | 12/1997 | Petkovsek | 283/61 |
| 5,746,450 A | * | 5/1998 | Petkovsek | 283/61 |
| 5,848,809 A | * | 12/1998 | Petkovsek | 283/61 |
| 5,848,810 A | * | 12/1998 | Beaudoin et al. | 283/67 |
| 5,860,904 A | * | 1/1999 | Petkovsek | 493/183 |
| 5,887,904 A | * | 3/1999 | Petkovsek | 283/61 |
| 5,890,647 A | * | 4/1999 | Petkovsek | 229/92.1 |
| 5,918,802 A | * | 7/1999 | Petkovsek | 229/300 |
| 5,950,910 A | * | 9/1999 | Petkovsek | 229/92.8 |
| 5,970,458 A | * | 10/1999 | Petkovsek | 704/275 |
| 5,984,365 A | * | 11/1999 | Petkovsek | 283/67 |
| 6,003,902 A | * | 12/1999 | Petkovsek | 283/61 |

* cited by examiner

*Primary Examiner*—Gabriel Garcia
(74) *Attorney, Agent, or Firm*—Patents+TMS, P.C.

(57) ABSTRACT

An assembly for mailing an article requiring delivery by a special service and a method and system for imaging the same are provided. The assembly includes a generic mailing label having a back side adhesively and detachably affixed to a backing sheet as well as a multi-colored panel ribbon for imprinting special service mailing information thereon. The label may be imaged with all of the information necessary, including a colored background, to serve as one of many types of special service mailing labels. Removal of the label from the associated backing sheet allows the label to be permanently affixed to a mailpiece. Upon delivery of the mailpiece, a return receipt postcard portion of the label may be removed and forwarded to the sender of the mailpiece as a return receipt. A method and system for the automatic imaging of such mailing label are also provided wherein the sender of the mailpiece may obtain a special service mailing label from a vending-type machine upon providing all of the required information for the desired special mailing service.

13 Claims, 6 Drawing Sheets

GENERIC SPECIAL SERVICE MAILING ASSEMBLY AND A SYSTEM AND METHOD FOR AUTOMATING THE IMAGING OF SAME

This application is continuation-in-part application of co-pending U.S. patent application Ser. No. 08/855,032, filed May 13, 1997.

BACKGROUND OF THE INVENTION

The present invention generally relates to a form for mailing an article requiring special services. More specifically, the present invention relates to a generic mailing label which may be configured to serve as a special service mailing label and which may be automatically dispensed by a mailing label vending machine. In addition, the present invention relates to a method and system for fully automating the imaging of a generic mailing label to configure the same as a special service mailing label.

It is, of course, known to provide specialized postal processing and handling of particular mailpieces. Such special services include the preparation of certified mail, registered mail, insured mail, recorded delivery mail, return receipt for merchandise mail, C.O.D. and the like. The primary disadvantage of such special service mailings is that they require a rather extensive amount of manual preparation and labor prior to mailing. The known procedures typically require printing or writing information on various slips of paper and then attaching such slips to the outside of an envelope or other mailpiece. Often, carbon paper is used to assist in making the attachments. As an example, to prepare a certified mailpiece, the forms are supplied by the United States Postal Service to the customer. The customer must separately address and complete a certified mailing receipt, both faces of a return receipt card, an envelope or mailpiece in which the mail is to be mailed and a request for return service on the face of the envelope. Then, the customer or postal service employee must affix each of the completed parts to the envelope using glue, an adhesive, tape or the like.

Clearly, the current methods known for preparing mailpieces or shipping items for special services are tedious, complicated, and labor intensive, particularly for businesses and institutions in which items such as notifications, reminders, or valuable documents are commonly sent by specialized mail services. In many instances, the delivery of such mailpieces must be documented by recording of U.S. Postal Service or other service return receipt when it arrives back to the sender. This task is also time consuming and has great potential for error when all of the identifying information from each return receipt card must be entered or recorded by hand.

Despite these shortcomings, the various special service types of mailing are still used extensively by individuals as well as companies. However, when the above-mentioned difficulties in processing such mail and preparing the same for mailing are multiplied by a large number of mailpieces, the time and labor intensive nature of preparing the special service mailings becomes quite costly and results in an inefficient use of employee time. Further complicating such procedures is the fact that different types of forms and envelopes are used for each different type of special mailing service.

A need, therefore, exists for an improved special service mailing assembly which can be prepared substantially automatically and which can be used for all types of special mailing services.

SUMMARY OF THE INVENTION

The present invention provides a generic mailing label which can be automatically configured to serve as a special service mailing label. In addition, the present invention provides a method and a system for fully automating the imaging of the generic mailing label to configure the same as a special service mailing label.

To this end, in an embodiment, the present invention provides a method for automating imaging of a generic mailing label for one of a plurality of special mailing services for a mailpiece requiring delivery by a selected one of the plurality of special mailing services. The method comprises the steps of: providing a label; selecting one of the plurality of special mailing services for the mailpiece; and printing imaging data on the label with a multi-colored panel ribbon wherein the imaging data is associated with the selected one of the plurality of special mailing services.

In an embodiment, the method further comprises the steps of: entering data necessary to effect delivery of the mailpiece by the selected one of the plurality of special mailing services for the mailpiece; and processing the data to generate the corresponding imaging data.

In an embodiment, the method further comprises the step of: printing textual information on the label with one panel area of the multi-colored panel ribbon wherein the textual information is part of the imaging data.

In an embodiment, the method further comprises the step of: printing a colored background on a designated area of the label with one of a plurality of colored panel areas on the multi-colored panel ribbon, wherein the colored background conforms with existing postal guidelines on a color designation representative of the selected one of the plurality of special mailing services.

In an embodiment, the method further comprises the step of: sequentially printing (a) textual information on the label with one panel area of the multi-colored panel ribbon wherein the textual information is part of the imaging data, and (b) a colored background on a designated area of the label with one of a plurality of colored panel areas on the multi-colored panel ribbon, wherein the colored background conforms with existing postal guidelines on a color designation representative of the selected one of the plurality of special mailing services.

In an embodiment, the method further comprises the steps of: positioning an area of the label to be printed in substantially parallel and adjacent relation to the multi-colored panel ribbon; and effecting movement between the area of the label to be printed and the multi-colored panel ribbon for the printing of imaging data.

In another embodiment of the present invention, a system is provided for automating imaging of a generic mailing label for one of a plurality of special mailing services for a mailpiece requiring delivery by a selected one of the plurality of special mailing services. The system comprises: means for selecting one of the plurality of special mailing services for the mailpiece; and a multi-colored panel ribbon for printing imaging data on the label wherein the imaging data is associated with the selected one of the plurality of special mailing services.

In an embodiment, the system further comprises: means for entering data necessary to effect delivery of the mailpiece by the selected one of the plurality of special mailing services for the mailpiece; and means for processing the data to generate corresponding imaging data.

In an embodiment, the system further comprises: a panel area on the multi-colored panel ribbon for printing textual information on the label wherein the textual information is part of the imaging data.

In an embodiment, the system further comprises: a plurality of colored panel areas on the multi-colored panel ribbon for printing respective colored backgrounds on a designated area of the label wherein each respective colored background conforms with existing postal guidelines on a color designation representative of the selected one of the plurality of special mailing services.

In an embodiment, the system further comprises: a plurality of substantially planar and rectangular colored panel areas adjacently positioned on the multi-colored panel ribbon.

In an embodiment, the system further comprises: a substantially planar and rectangular panel area on the multi-colored panel ribbon for printing textual information on the label wherein the textual information is part of the imaging data and wherein the panel area has a size corresponding to an overall area of the label to be imprinted with the textual information.

In an embodiment, the system further comprises: a plurality of substantially planar and rectangular colored panel areas adjacently positioned on the multi-colored panel ribbon for printing respective colored backgrounds on a designated area of the label wherein each respective colored background conforms with existing postal guidelines on a color designation representative of the selected one of the plurality of special mailing services and wherein each colored panel area has a size corresponding to the designated area of the label to be imprinted with the colored background.

It is, therefore, an advantage of the present invention to provide an improved assembly for mailing an article requiring delivery by a special service.

Another advantage of the present invention is to provide a method and system for fully automating the imaging of variable information upon a generic mailing label resulting in a special service mailing label.

A further advantage of the present invention is to provide a simplified method and system for mailing an article requiring delivery by a special service.

Moreover, it is an advantage of the present invention to provide a method and system for configuring a generic mailing label to serve as one of several types of special service mailing labels.

In addition, an advantage of the present invention is to provide a method and system for generating a special service mailing label from a postal vending machine.

Additional features and advantages of the present invention are described in, and will be apparent from, the detailed description of the presently preferred embodiments and from the drawings.

DETAILED DESCRIPTION OF THE PRESENTLY PREFERRED EMBODIMENTS

Figure 1:
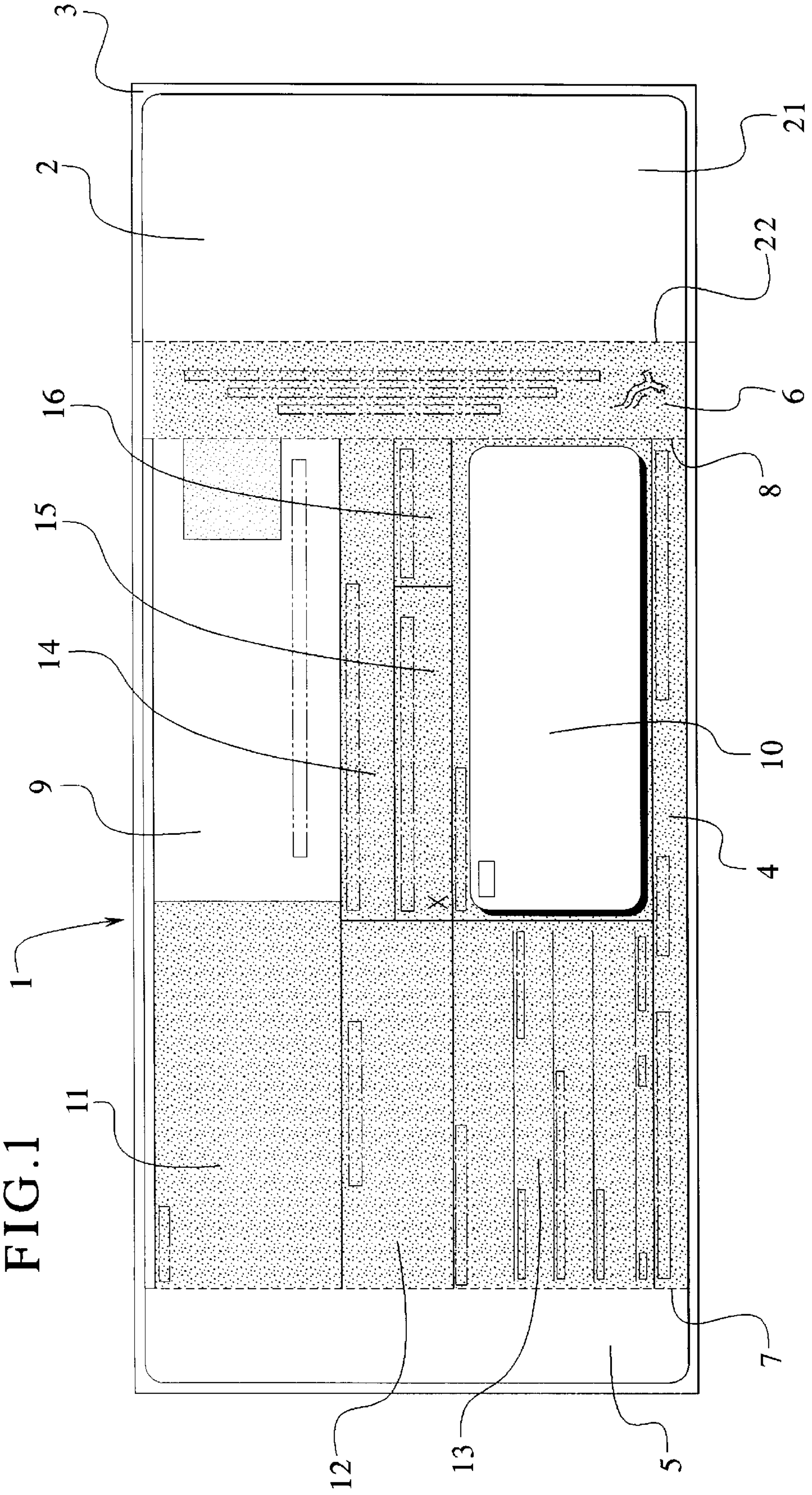
FIG. 1 illustrates a plan view of a front side of an embodiment of the mailing assembly of the present invention.

Referring now to the drawings, wherein like numerals refer to like parts, FIG. 1 is a front plan view that generally illustrates an embodiment of a mailing assembly 1 formed from a mailing label 2 and a backing sheet 3. A number of these mailing assemblies 1 may be continuously and detachably interconnected (end-to-end, for example) such that the mailing assemblies 1 may be provided on a reel or roll. The reel or roll may be provided for use with, for example, a dispensing device. The mailing label 2 may be peeled away from the backing sheet 3 whereupon the mailing label 2 subsequently may be affixed to a mailpiece. The mailing assembly 1 is capable for use in mailing an article requiring a particular type of special mailing service. Such mailing services include certified mail, insured mail, registered mail, recorded delivery mail, C.O.D., return receipt for merchandise and the like. Further, the mailing assembly 1 is intended to serve the needs of both individual users (made available, for example, at a local post office) and business users (addressing such needs as On-Demand and/or Point-Of-Sale applications).

The mailing assembly 1, in combination with the mailing label 2, forms a generic mailing label which, after imprinting, can be used for any one of a plurality of special services required for delivery of a given mailpiece. Therefore, the mailing assembly 1 may be incorporated for use in a system and method described hereinafter with reference to FIGS. 6 and 7 for any one of a plurality of special services required for delivery of a mailpiece without requiring a different form for each one of the plurality of special services generally available and offered by, for example, the United States Postal Service.

The mailing label 2 of the embodiment shown in FIG. 1 consists of four primary parts: a first anchor portion 5, a second anchor portion 6, an auxiliary label 21 and a return receipt postcard 4. The return receipt postcard 4 is removably attached to the first anchor portion 5 along a first perforated tear line 7 and removably attached to the second anchor portion 6 along a second perforated tear line 8. The significance of the detachability of the return receipt postcard 4 is discussed in more detail in connection with FIG. 4.

The return receipt postcard 4 of the mailing label 2 includes a number of information areas necessary for the proper delivery and acknowledgment of a mailpiece via a particular type of special mailing service. Specifically, the return receipt postcard 4 includes a special service identification area 9 which, pursuant to specific mailing requirements desired by a user of the mailing label 2, is imprinted with information relating to the type of special mailing service used, the individual article number for that particular mailpiece and, in some cases, a colored background which is representative of the one color that the postal service has designated for that particular type of mailing service. For example, if it is desired that a mailpiece be sent via certified mail, special service identification area 9 may include the words "CERTIFIED MAIL," a designated article number and a substantially green background. Other background colors used for the special service identification area 9 include, for example, blue for insured mail, red for registered mail and brown for return receipt for merchandise. Therefore, the mailing label 2 may be imprinted with a color on demand and/or a designation on demand; i.e., "CERTIFIED MAIL". The mailing label 2 is generic in format so that it is capable of receiving information on demand relating to the type of special service requested.

In addition, the return receipt postcard 4 includes an article addressee area 10 for the imprinting of the addressee's address. Such information may, if so desired, also be completed by the sender, prior to mailing, in an addressee address section 13. Both the special service identification area 9 and the article addressee area 10 may have a background color that contrasts with the color of the remainder of the return receipt postcard 4 so as to facilitate the reading of any machine-readable code which may be imprinted in these areas. Other areas, as well, may include similar color-contrasting portions.

Other information which may be imprinted on the return receipt postcard 4 includes the relevant sender information in a sender information area 11 and tracking information found in a document control area 12. Such tracking information includes, at least, a document control number bar code and a specific article number. Indeed, such tracking information is intended to include the United States Postal Service's tracking bar coding symbols which would, of course, be compatible with the Service's existing track and trace network.

Upon delivery of the relevant mailpiece, additional information may be entered on the return receipt postcard 4. Indeed, the name of the individual receiving such mailpiece may be entered in a "Received By" area 14, his or her signature entered in a signature area 15 and the date on which delivery of the mailpiece occurred entered in a "Date of Delivery" area 16.

The first anchor portion 5 and the second anchor portion 6 serve the purpose of securing the mailing label 2 to a mailpiece. The first anchor portion 5 also contains various identifier information which corresponds to that which is on the return receipt postcard 4. Specifically, the first anchor portion 5 includes the same special service mailing information which is found in the special service identification area window 9 of the return receipt postcard 4.

Similarly, the auxiliary label 21 may include the return address of the sender of the mailpiece much like that information which is found in the sender information area 11. If desired, the auxiliary label 21 may be peeled off of the backing sheet 3, detached from the second anchor portion 6 along a third perforated tear line 22 and affixed to the mailpiece 20 as a conventional return address label separate and apart from the remainder of the mailing label 2. Preferably, the back side of the auxiliary label 21 includes an adhesive that allows the label 21 to be removed from the backing sheet 3 and subsequently attached to the mailpiece. Alternatively, the auxiliary label 21 may include address information regarding to whom the mailpiece is being sent. When printed with addressee's information, the label 21 may be detached and attached to the mailpiece as a mailing label.

Yet another use of the auxiliary label 21 is as a customer receipt. The receipt may include, for example, such information as the article number, the addressee's address, the type of special mailing service used and the fees associated for such service. When used in this manner, the label 21 may not be peeled away from the backing sheet 3. Rather, that portion of the backing sheet 3 which is adhesively connected to the auxiliary label 21 may remain affixed thereto as the label 21 is detached from the rest of the mailing label 2 along perforation line 22. Of course, the auxiliary label 21, when constructed as a customer receipt, may be provided without an adhesive backing.

As mentioned above, upon delivery of the relevant mailpiece, the return receipt postcard 4 may be detached from the rest of the mailing label 2 along the first and second perforated tear lines 7 and 8, respectively. Identical identifying information is contained on both the return receipt postcard 4 and the first anchor portion 5 to aid in the accurate tracking of the mailpiece both during and after delivery.

Figure 2:
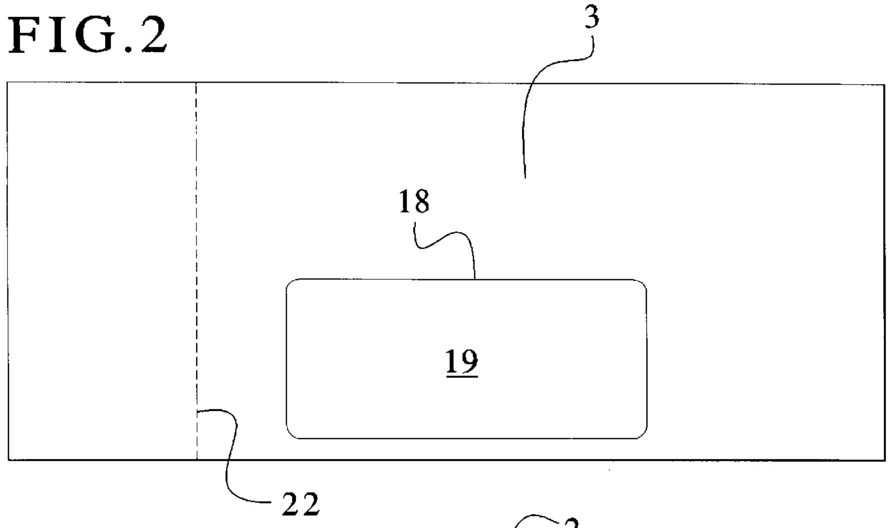
FIG. 2 illustrates a plan view of a back side of an embodiment of the mailing assembly of the present invention.

Referring now to FIG. 2, a back plan view of an embodiment of the mailing assembly 1 is illustrated. This back side consists entirely of the backing sheet 3, given that the backing sheet 3 has height and width dimensions greater than those of the mailing label 2 (see FIG. 1). The backing sheet 3 includes a frozen printable "Return To" area 19 which is scored along score/cut line 18 and which is removably separable from the rest of the backing sheet 3 so as to remain securely attached to the return receipt postcard 4. After printing an address on the frozen printable "Return To" area 19, the backing sheet 3 may be removed from the mailing label 2 without removal of the frozen printable "Return To" area 19. The combination of the backing sheet 3 with the frozen printable "Return To" area 19 provides a uniform thickness in the mailing assembly 1 which simplifies the printing of the same. Indeed, this also allows both sides of the mailing assembly 1 to be substantially simultaneously imprinted with information, if so desired. Of course, the backing sheet 3 may be constructed continuously, i.e. without a frozen label, such that removal of the backing sheet 3 exposes the entire back side of the return receipt postcard 4. Still further, the backing sheet 3 may be constructed with a cut-out section at the point of the frozen label such that the printing of the return address is performed directly on the back side of the return receipt postcard 4. Also present on the backing sheet 3 is the perforation line 22 which, if it is desired that the auxiliary label 21 be used as a customer receipt, allows that portion of the backing sheet 3 which may be adhesively connected to the auxiliary label 21 to be detached from the rest of the backing sheet 3 along with the auxiliary label 21.

Figure 3:
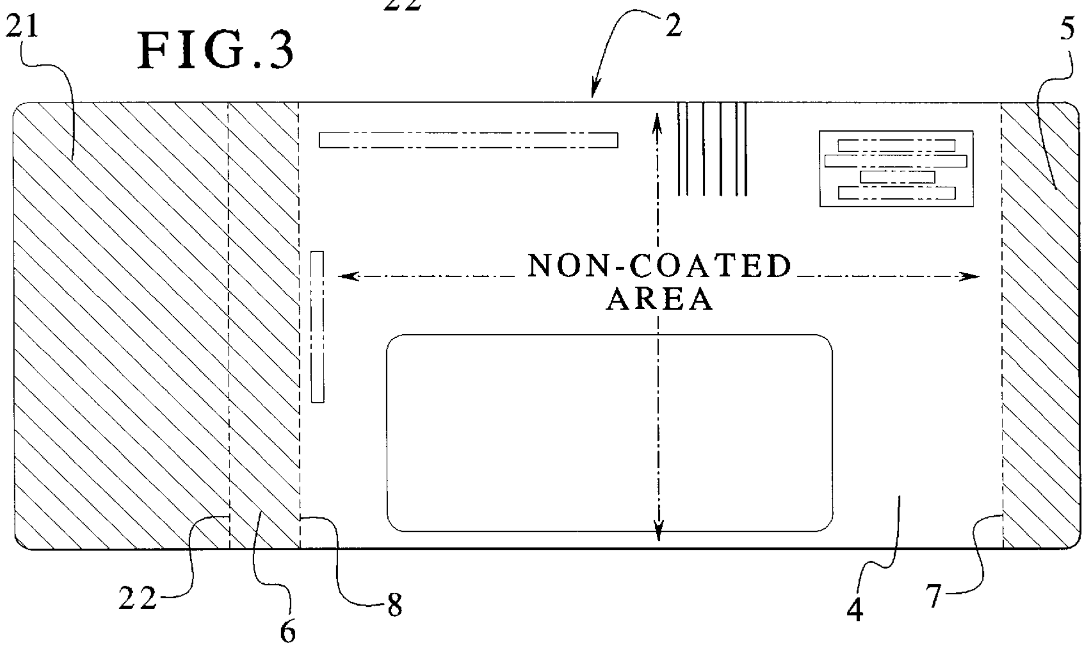
FIG. 3 illustrates a plan view of a back side of an embodiment of the mailing label removed from the mailing assembly of the present invention.

FIG. 3 shows a plan view of a back side of the mailing label 2 of the present invention after removal of the backing sheet 3 thereon. As shown, the back sides of the first anchor portion 5 and the second anchor portion 6 are covered with an adhesive coating which serves the dual purpose of removably attaching the mailing label 2 to the backing sheet 3 and, subsequently, permanently attaching the mailing label 2 to a mailpiece. The auxiliary label 21 also has an adhesive backing whereby, upon detachment from the second anchor portion 6 along the third perforated tear line 22, the auxiliary label 21 may be affixed to a mailpiece as either a conventional return address label or an addressee's label. The return receipt postcard 4, defined as that area between the first perforated tear line 7 and the second perforated tear line 8, does not include any such adhesive backing.

Figure 4:
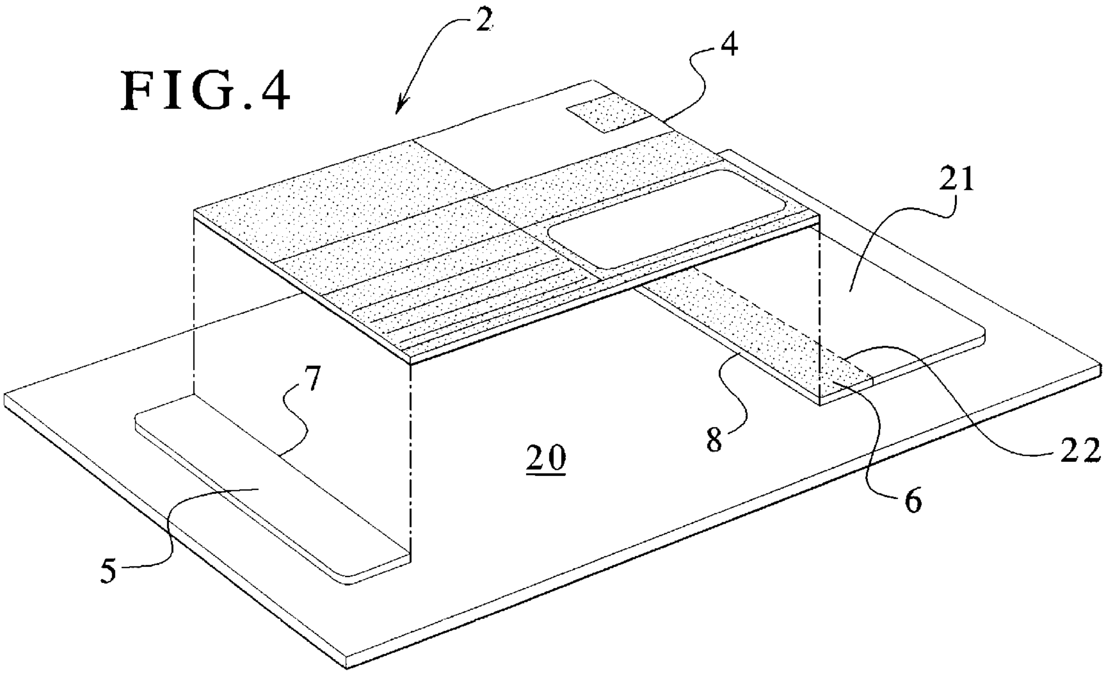
FIG. 4 illustrates a perspective view of a front side of an embodiment of the mailing label affixed to a mailpiece with a return receipt postcard of the mailing label detached from anchor portions of the mailing label.

Turning now to FIG. 4, a perspective view of a sample mailpiece 20 is shown having the mailing label 2 affixed thereupon. Actual affixation of the mailing label 2 to the mailpiece 20 is achieved via the adhesive backing found on the first and second anchor portions 5 and 6, respectively. Upon delivery of the mailpiece 20, the return receipt postcard 4 is detached from the rest of the mailing label 2 along the first and second perforated tear lines 7 and 8, respectively.

Figure 5:
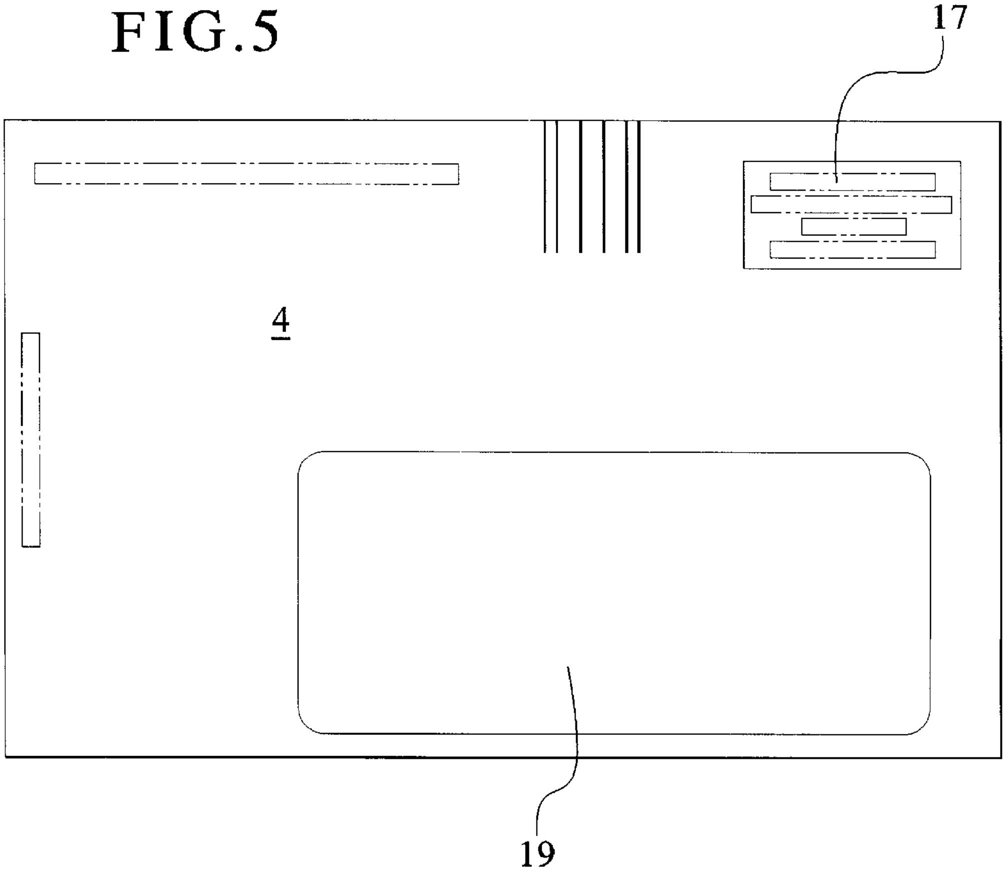
FIG. 5 illustrates a plan view of a back side of an embodiment of the return receipt postcard of the mailing label of the present invention.

FIG. 5 illustrates a plan view of the back side of the return receipt postcard 4. Information contained on this side of the return receipt postcard 4 is sufficient to allow the card to be mailed back to the proper sender. As shown, this side of the return receipt postcard 4 includes a "Return To" area 19 and a postage information area 17. Typically, the postage information area 17 is imprinted with prepaid postage information to allow for the immediate and prepaid return delivery of the return receipt postcard 4 to the proper sender.

Figure 6:
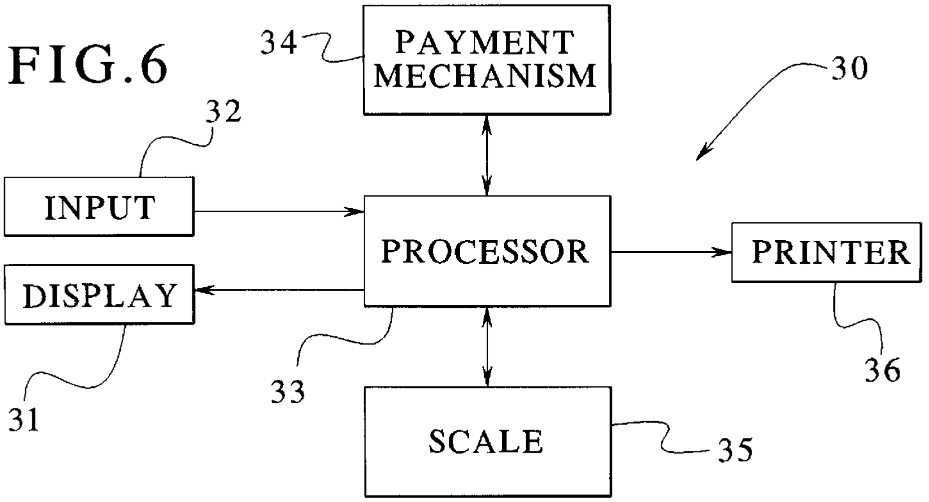
FIG. 6 illustrates a diagram of an embodiment of a system for printing and dispensing special service mailing labels of the present invention.

FIG. 6 illustrates, in black-box form, an embodiment of the system 30 of the present invention. The system 30 may, for example, be in the form of a kiosk or vending machine which processes information and prints special service mailing labels implementing the mailing label embodiments previously described. Again, the system 30 is intended to serve not only the needs of individual users (made available, for example, at a local post office) but also the needs of private businesses. The system 30 may include a display 31 by which users of the system 30 (senders of special service mailpieces) are prompted to enter certain information. These users may then both select a particular type of special mailing service and enter all of the necessary mailing information associated with such special mailing service through an input device 32. The present invention contemplates a variety of displays 31 and input devices 32 and combinations of the same, including touch screens and/or keyboards. Both the display 31 and the input device 32 are in communication with a processor 33. The processor 33 has ultimate control over the information transmitted and received via the display 31 and the input device 32.

Once all of the details of the selected special mailing service desired are confirmed, the processor 33 determines a cost associated with the selected special mailing service. Payment for such service may then be required via a payment mechanism 34. The payment mechanism 34 may include coin/bill slots, credit card readers, keypads or the like. In addition, the system 30 may include a scale 35 or other like weighing device to compute the weight of the mailpiece. The processor 33 may take such weight into consideration when determining the cost for the selected special service.

Upon payment of the required fee at the payment mechanism 34, the processor 33 instructs the printer 36 to print the necessary special service mailing information upon a generic mailing label of the present invention. As already discussed in connection with the above-referenced embodiments, such information includes both addressee and sender information and, more importantly, the special mailing service to be used, the specific article mailing number and the colored background associated with this special service. Indeed, the printer 36 has full color-printing capabilities to allow for the imprinting of a particular color on the various areas of a generic mailing label for the label's effective use as a special service mailing label. Having been configured for a special mailing service, the label may then be affixed to the desired mailpiece.

Figure 7:
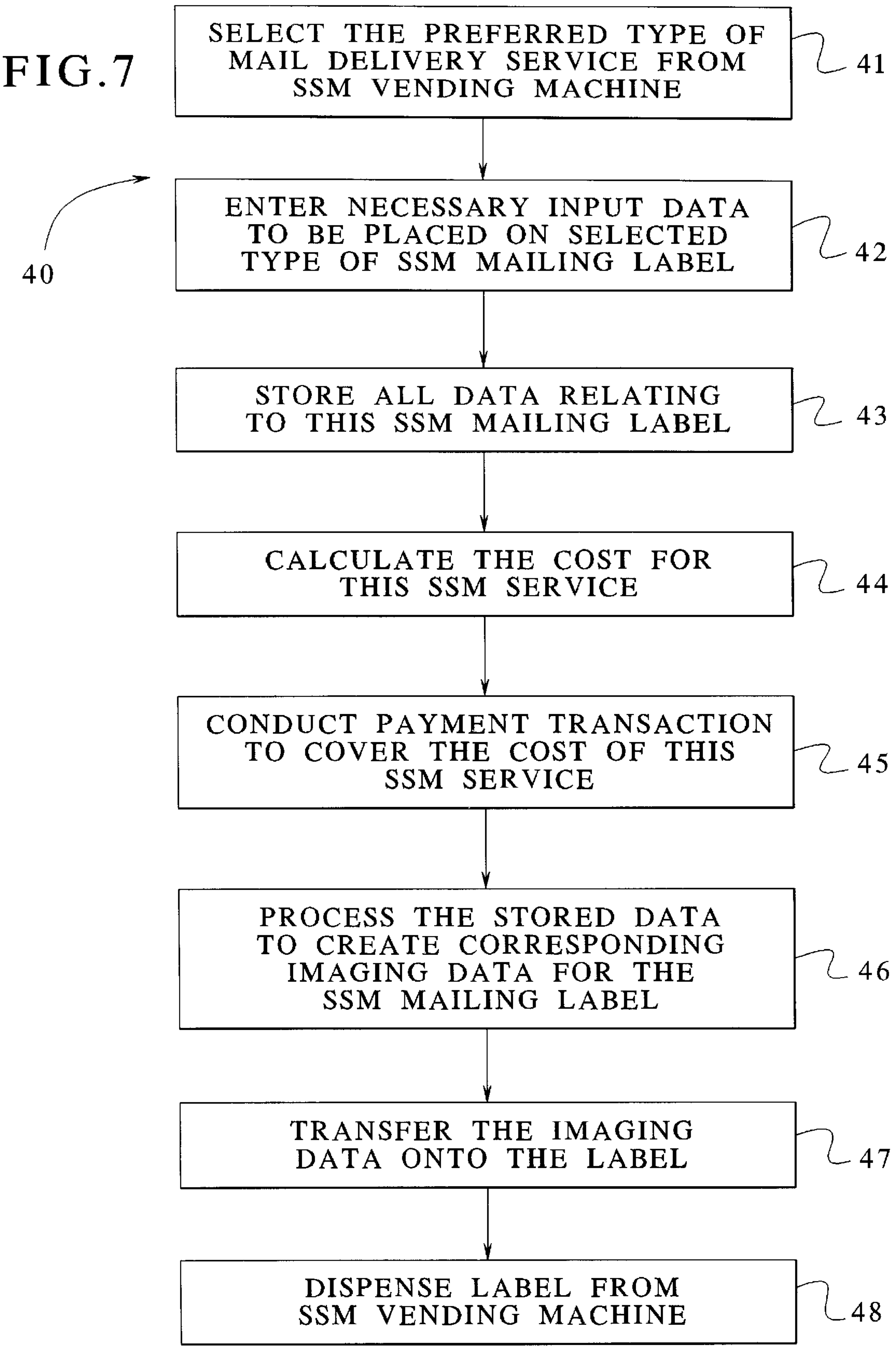
FIG. 7 illustrates a flow chart of an embodiment of a method for creating labels necessary for delivery of an article by a special service of the present invention.

Referring now to a detailed description of the method of the present invention as illustrated in an embodiment shown in the flow chart 40 of FIG. 7, the method provides for the fully automatic imaging of a generic mailing label whereupon such label may serve a special service mailing purpose. The method may be performed using the system 30 as described above.

The method of the embodiment of the invention illustrated in FIG. 7 includes a step 41 of selecting the preferred type of mail delivery service from a Special Service Mailing (SSM) vending machine. As already discussed, such services may include certified mail, registered mail, insured mail, recorded delivery mail, return receipt for merchandise mail, C.O.D. and the like. Pursuant to the present method, a single generic mailing label, such as that illustrated with reference to FIGS. 1–5, may be configured to serve as a special service mailing label for any one type of these special services. Step 42 requires that certain input data be entered based upon the type of SSM service selected in step 41. Such input data may include the type of special service, addressee's information, sender's information and the like. Step 43 provides for the storage of all such data which relates to this particular SSM label.

Step 44 provides for the calculation of a cost for the selected SSM service. Accordingly, prior to the actual imaging of a SSM mailing label, payment for such service, if required, must be completed at step 45. The method of payment pursuant to the present invention may be, for example, an actual cash transaction, debiting of a credit card, charging to an account number via a keypad, etc. The system 30 may incorporate a scale or other like weighing device (not shown) to compute weight of the mailpiece. The cost of delivery of a mailpiece may be affected by the weight and/or size of the mailpiece, the distance in which the mailpiece is sent, and/or the type of special service. Of course, other variables may exist that affect the cost of delivery of any given mailpiece.

Step 46 provides for the processing of the stored data to create corresponding imaging data which will be printed on the SSM label. At step 47, the imaging data is actually transferred onto the mailing label. Again, such information includes both addressee and sender information and, more importantly, the special mailing service to be used, a specific article mailing number and the colored background associated with this special service. The actual transfer of imaging data at step 47 therefore includes imprinting a particular color on the various areas of the generic mailing label for the label's effective use as a special service mailing label. Once the configuration of the generic mailing label as a special service mailing label is complete, the label is dispensed from the vending machine, as shown at step 48.

Figure 8:
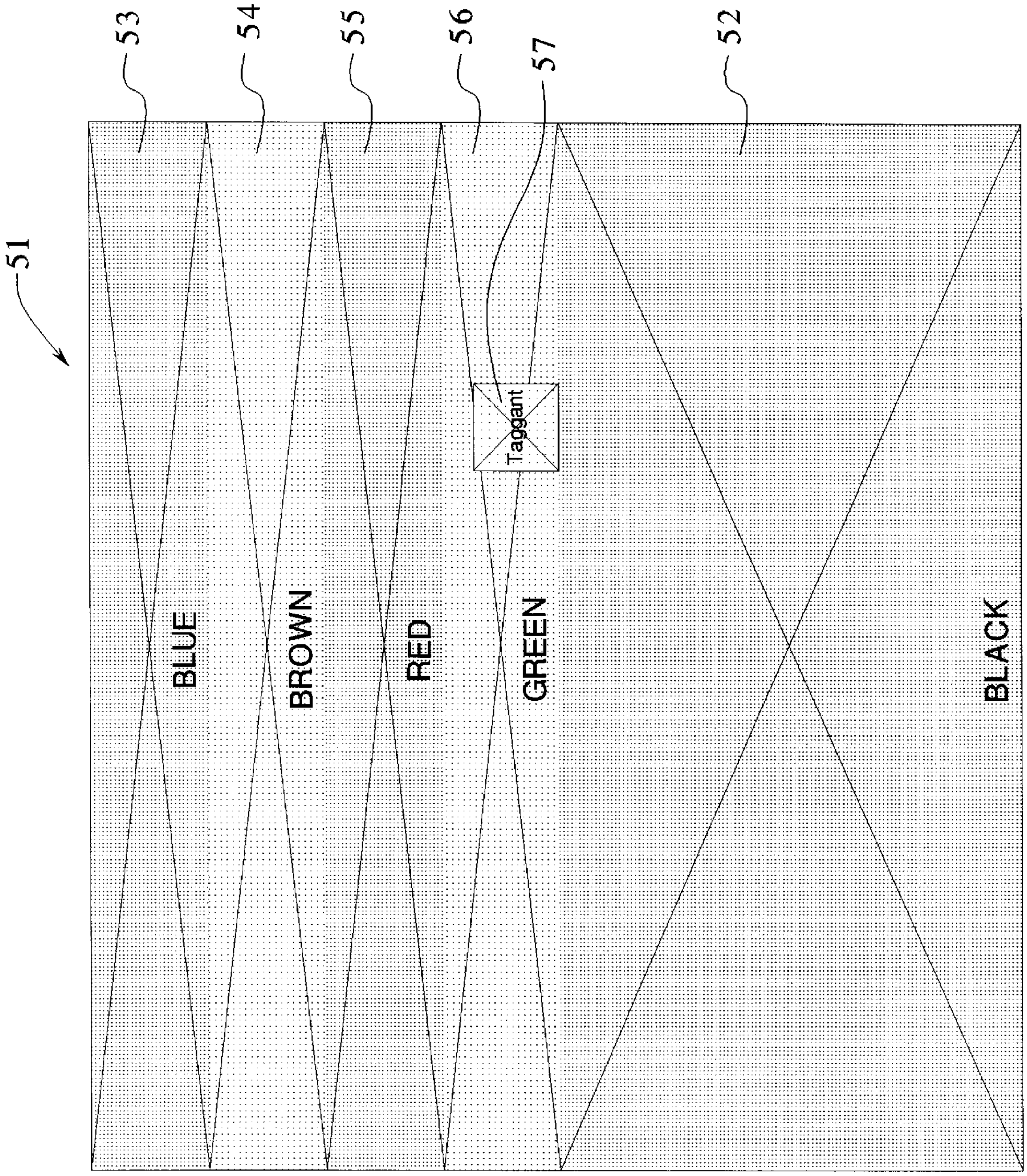
FIG. 8 illustrates a plan view of a multi-colored panel ribbon incorporated as part of a system and method for creating special service mailing labels of the present invention.
Figure 9:
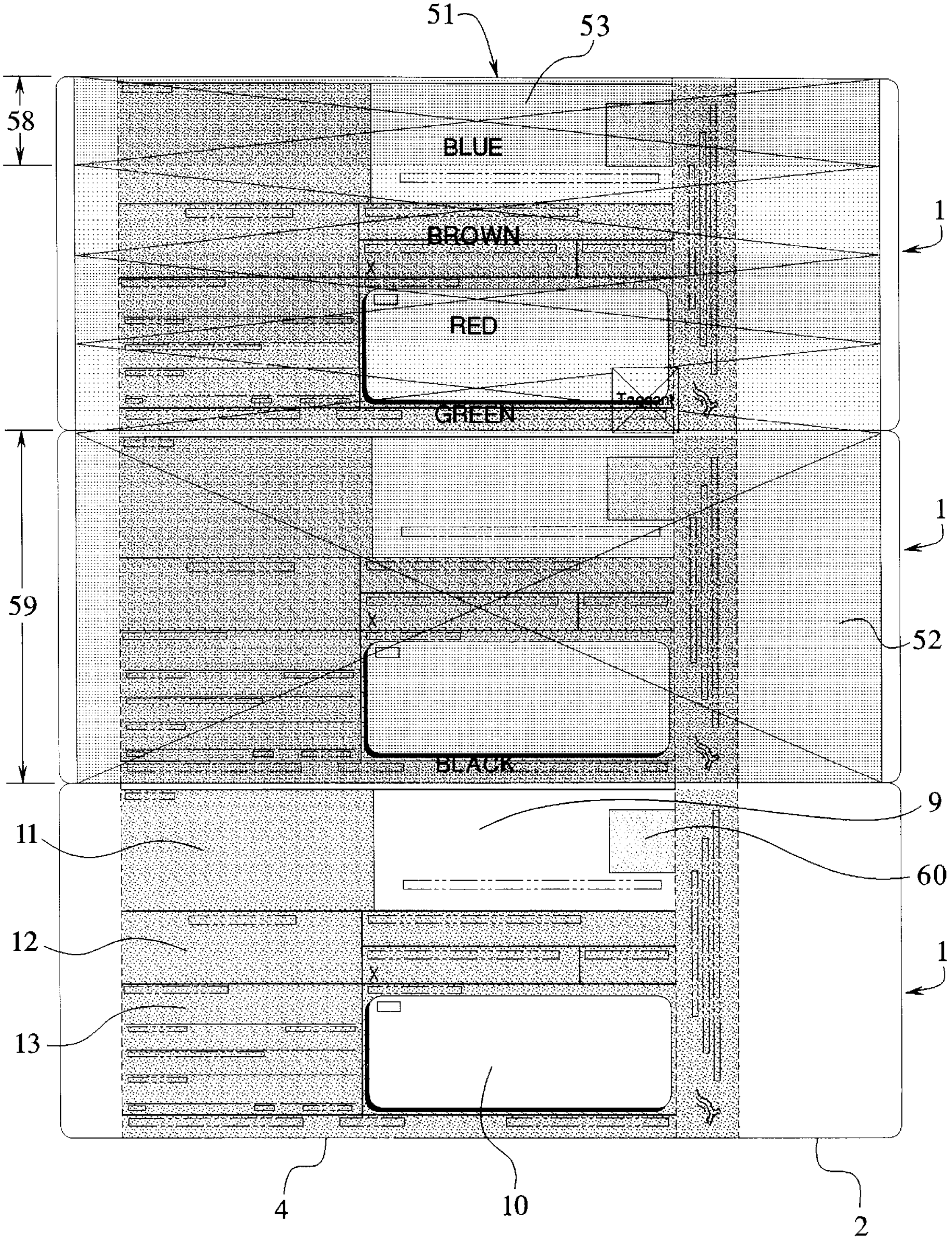
FIG. 9 illustrates a plan view of a multi-colored panel ribbon superimposed over respective printable areas of a plurality of mailing labels in accordance with the teachings of a system and method of the present invention.

Turning to FIGS. 8 and 9, a multi-colored panel ribbon 51 is shown which may be incorporated in an embodiment of the method and system of the present invention. The multi-colored panel ribbon 51 assists in providing for the fully automatic imaging of a generic mailing label whereupon the label may then serve a special mailing purpose. In connection with the system 30 shown in black-box form in FIG. 6, the multi-colored panel ribbon 51 may be incorporated into the printer 36. Similarly, in connection with the method of the present invention shown in the flowchart of FIG. 7, the multi-colored panel ribbon 51 may be implemented at step 47 wherein the imaging data is actually transferred onto the mailing label.

As shown in FIG. 8, the multi-colored panel ribbon 51 is a unitary piece which includes five separate and adjacently positioned colored panel areas 52, 53, 54, 55 and 56. The panel area 52 is approximately the same size and shape as a single label 2 of a mailing assembly 1. The panel area 52 is intended to imprint all of the necessary variable information on the front of the label 2. In a preferred embodiment of the present invention, the panel area 52 is capable of printing in black. Of course, other colors may be implemented for the particular application of the panel area 52.

The remaining colored panel areas are intended to imprint their respective colors on the particular areas of the generic mailing label 2 so that the label 2 may be effectively used as a special service mailing label. Specifically, the multi-colored panel ribbon 51 may include a blue panel area 53 for use with insured mail, a brown panel area 54 for use with return receipt for merchandise purposes, a red panel area 55 for registered mail purposes and a green panel area 56 for certified mail purposes. The order in which the colored panel areas appear on the multi-colored panel ribbon 51 is not critical. Similarly, the variety of colors which might be incorporated into the multi-colored panel ribbon 51 should not be limited to those specifically disclosed above. Indeed, the present invention contemplates that any number of colors, and combinations thereof, might be used to convert a generic mailing label into a special services mailing label.

Each of the colored panel areas is particularly sized to correspond with that area on the label 2 which is imprinted with a colored background. In addition, as specifically shown in FIG. 8, the green panel area 56 may include an uncolored taggant area 57 which corresponds to a taggant area 60 on the label 2 which typically remains uncolored, but is separately printed with a taggant. If desired or necessary, additional taggant areas such as taggant area 57 may be incorporated into other colored panel areas.

In FIG. 9, the multi-colored panel ribbon 51 is shown superimposed over a chain of interconnected mailing assemblies 1. As the generic mailing label 2 of each mailing assembly 1 passes beneath the multi-colored panel ribbon 51, it may be imprinted with the requisite textual data via the panel area 52 and may be imprinted with a colored background associated with the desired special service via one of the remaining colored panel areas.

As shown in FIG. 9, the panel area 52 has a height 50 which is approximately equal to the height of the label 2 and the mailing assembly 1. Accordingly, the black panel area 52 may be used to imprint variable information in the special service identification area 9, the addressee area 10, the sender information area 11, the document control area 12 and the addressee address section 13 of the return receipt postcard 4.

In addition, the special service identification area 9 of the return receipt postcard 4 is that area which may be imprinted with a colored background in compliance with special service requirements. As such, each of the remaining colored panel areas, for example, the blue panel area 53, has a height 58 which corresponds to the desired height of the colored background area of the special service identification area 9.

The direction of travel of the chain of interconnected mailing assemblies 1 with respect to the multi-colored panel ribbon 51 is not critical. Indeed, the imprinting of a colored background on the label 2 may take place prior to imprinting the label 2 with the variable information by the panel area 52.

The present invention may be incorporated into a color printing system that incorporates a printing cartridge. Such a system employs a cartridge or cartridges having four colors to accomplish the same task as the system described above. Similarly, the embodiment described is intended to be used with thermal, bubble, laser and ink jet types of printers. Indeed, the spirit of this embodiment lies in the ability to incorporate the multi-colored panel ribbon 51 into the method and system herein described to assist in the automatic generation of a special service mailing label from a generic mailing label.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the hereinafter appended claims.

I claim:

1. A method for automating imaging of a generic mailing label for one of a plurality of special mailing services for a mailpiece requiring delivery by a selected one of the plurality of special mailing services, the method comprising the steps of:

providing a generic mailing label adaptable for use with any one of the plurality of special mailing services;

selecting one of the plurality of special mailing services for the mailpiece; and printing imaging data on the generic mailing label with a multi-colored panel ribbon wherein use of the multi-colored panel ribbon allows printing of one of a plurality of colors corresponding to recognized colors to effect delivery of the mailpiece by any one of the plurality of special mailing services using the generic mailing label wherein the imaging data includes a special service designator corresponding to the selected special mailing service and further wherein the imaging data includes information necessary to effect the delivery of the mailpiece by the selected special mailing service.

2. The method of claim 1 further comprising the steps of:

entering data necessary to effect delivery of the mailpiece by the selected one of the plurality of special mailing services for the mailpiece; and processing the data to generate the corresponding imaging data.

3. The method of claim 1 further comprising the step of:

printing textual information on the label with one panel area of the multi-colored panel ribbon wherein the textual information is part of the imaging data.

4. The method of claim 1 further comprising the step of:

printing a colored background on a designated area of the label with one of a plurality of colored panel areas on the multi-colored panel ribbon, wherein the colored background conforms with existing postal guidelines on a color designation representative of the selected one of the plurality of special mailing services.

5. The method of claim 1 further comprising the step of:

sequentially printing (a) textual information on the label with one panel area of the multi-colored panel ribbon wherein the textual information is part of the imaging data, and (b) a colored background on a designated area of the label with one of a plurality of colored panel areas on the multi-colored panel ribbon, wherein the colored background conforms with existing postal guidelines on a color designation representative of the selected one of the plurality of special mailing services.

6. The method of claim 1 further comprising the steps of:

positioning an area of the label to be printed in substantially parallel and adjacent relation to the multi-colored panel ribbon; and effecting movement between the area of the label to be printed and the multi-colored panel ribbon for the printing of imaging data.

7. A system for automating imaging of a generic mailing label for one of a plurality of special mailing services for a mailpiece requiring delivery by a selected one of the plurality of special mailing services, the system comprising:

a generic mailing label adaptable for use with any one of the plurality of special mailing services;

means for selecting one of the plurality of special mailing services for the mailpiece; and a multi-colored panel ribbon for printing imaging data on the generic mailing label wherein use of the multi-colored panel ribbon allows printing of one of a plurality of colors corresponding to recognized colors to effect delivery of the mailpiece by any one of the plurality of special mailing services using the generic mailing label wherein the imaging data includes a special service designator corresponding to the selected special mailing service and further wherein the imaging data includes information necessary to effect delivery of the mailpiece by the selected special mailing service.

8. The system of claim 7 further comprising:

means for entering data necessary to effect delivery of the mailpiece by the selected one of the plurality of special mailing services for the mailpiece; and means for processing the data to generate corresponding imaging data.

9. The system of claim 7 further comprising:

a panel area on the multi-colored panel ribbon for printing textual information on the label wherein the textual information is part of the imaging data.

10. The system of claim 7 further comprising:

a plurality of colored panel areas on the multi-colored panel ribbon for printing respective colored backgrounds on a designated area of the label wherein each respective colored background conforms with existing postal guidelines on a color designation representative of the selected one of the plurality of special mailing services.

11. The system of claim 7 further comprising:

a plurality of substantially planar and rectangular colored panel areas adjacently positioned on the multi-colored panel ribbon.

12. The system of claim 7 further comprising:

a substantially planar and rectangular panel area on the multi-colored panel ribbon for printing textual information on the label wherein the textual information is part of the imaging data and wherein the panel area has a size corresponding to an overall area of the label to be imprinted with the textual information.

13. The system of claim 7 further comprising:

a plurality of substantially planar and rectangular colored panel areas adjacently positioned on the multi-colored panel ribbon for printing respective colored backgrounds on a designated area of the label wherein each respective colored background conforms with existing postal guidelines on a color designation representative of the selected one of the plurality of special mailing services and wherein each colored panel area has a size corresponding to the designated area of the label to be imprinted with the colored background.

* * * * *